3,206,223
TRICYCLE WITH LOCKING CASTER WHEEL
Kenneth W. Frye, Pasadena, Calif.
(2117 Lemon St., Alhambra, Calif.)
Filed Nov. 14, 1960, Ser. No. 68,703
1 Claim. (Cl. 280—274)

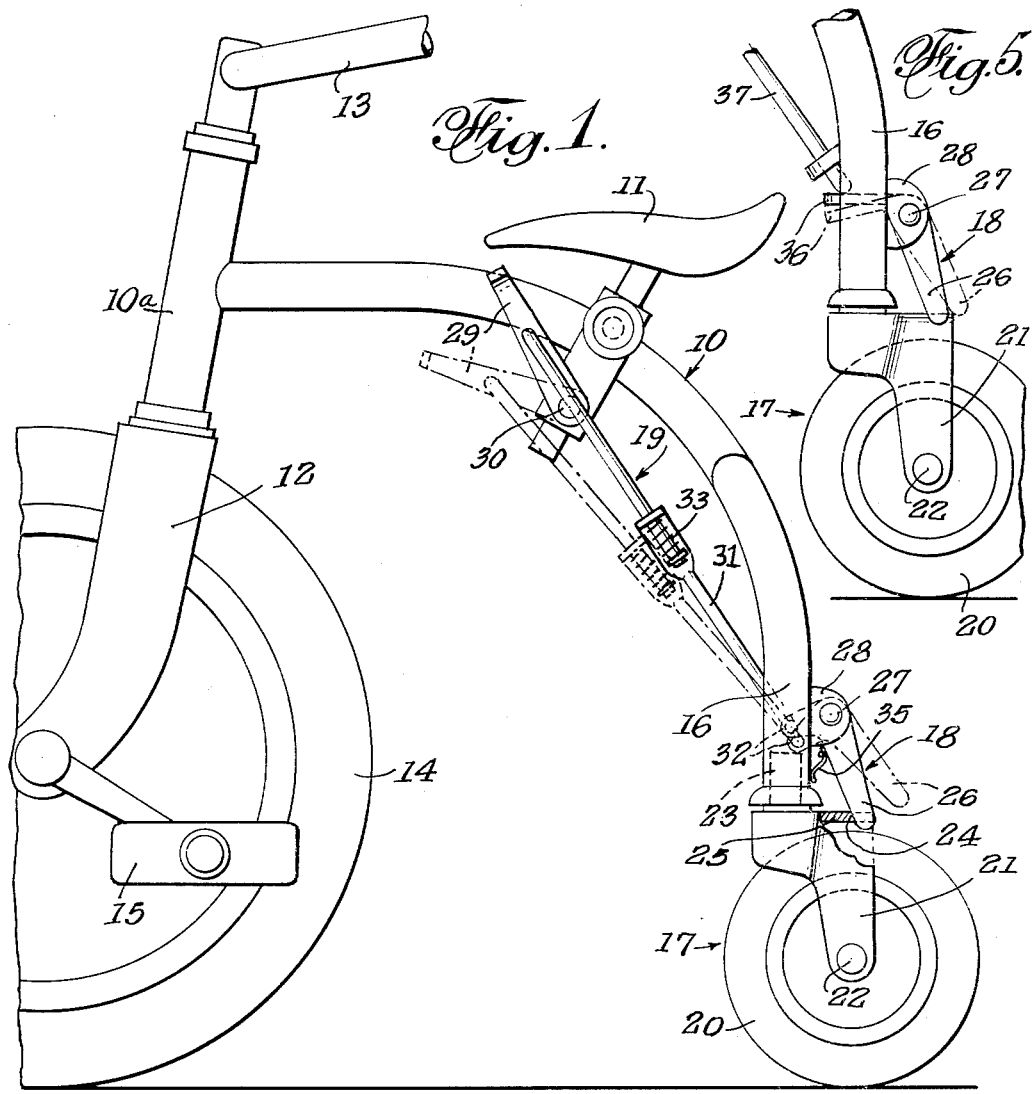# TRICYCLE WITH LOCKING CASTER WHEEL
Sept. 14, 1965 — K. W. FRYE — 3,206,223
Filed Nov. 14, 1960
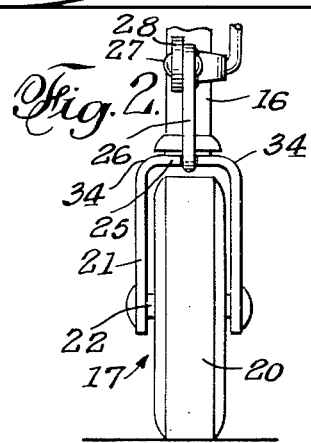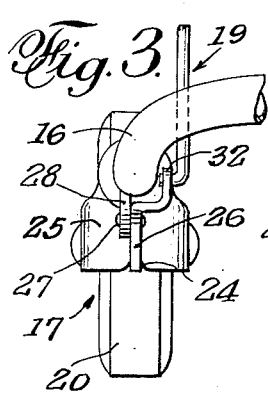
INVENTOR.
KENNETH W. FRYE
BY C. I. Stratton
ATTORNEY United States Patent Office 3,206,223
Patented Sept. 14, 1965

This invention relates to a tricycle and deals, generally, with improvements in three-wheeled vehicles and, more particularly, in such vehicles designed for use by children.

An object of the present invention is to provide a novel construction for at least one of the rear wheels of a tricycle or similar vehicle whereby the same may be ridden, driven and controlled in the usual way and may be converted to a vehicle that will describe varied and unpredictable paths or courses, thereby greatly enhancing the diverting and entertaining features and uses of the vehicle.

Another object of the invention is to provide a three-wheeled velocipede which, in addition to the usual steering wheel, has rear free-wheeling caster wheels that, when free, allow the vehicle to have the unpredictable type of movement above mentioned and, when one or both of the caster wheels are locked in trailing position, provides for normal operation of the vehicle.

A further object of the invention is to provide means, in a vehicle as above characterized, to release or lock the caster wheels from a position on the vehicle seat, thereby further increasing the entertainment properties of the vehicle in use.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description, and which is based on the accompanying drawing. However, said drawing merely shows, and the following description merely describes, preferred embodiments of the present invention, which are given by way of illustration or example only.

In the drawing, like reference characters designate similar parts in the several views.

FIG. 1 is a partly broken side view of a three-wheeled velocipede embodying improvements according to the present invention.

FIG. 2 is a fragmentary rear view of one of the rear wheels of said velocipede, as in FIG. 1.

FIG. 3 is a top plan view thereof.

FIG. 4 is a broken plan view showing the wheel of FIGS. 2 and 3 in another position.

FIG. 5 is a fragmentary side view of a wheel such as in FIG. 1, showing a modification.

The three-wheeled velocipede or tricycle that is shown in the drawing conventionally comprises a frame 10 on which is mounted a seat 11, a steering fork 12 at the front of said frame with a handle 13 to steer the front wheel 14 in the bifurcation of the fork, and pedals 15 for turning said wheel under power exerted by the feet of an occupant of seat 11. In the usual manner, said frame 10 is formed to have two rear frame portions 16 (one of which is shown), it being understood that said portions 16 are transversely spaced apart symmetrically relative to the fork bearing 10a of the frame 10 and to the seat 11.

According to the present invention, each frame portion 16 mounts a caster wheel 17, means 18 is provided to lock at least one of the wheels 17 in trailing position for normal operation of the tricycle, and means 19 is provided to actuate said means 18 by the rider from a position on the tricycle seat 11.

Each caster wheel 17 is generally conventional in that the same comprises a wheel 20, a caster frame 21 provided with an axle 22 on which the wheel 20 turns, and a pintle 23 extending upwardly from the frame 21 and offset from the axle 22. Said pintle, in the usual manner, is engaged in the rear frame portion 16, as indicated in FIG. 1, and it will be clear that the two caster wheels thus provided, together with the front steering wheel 14, support the tricycle so that the same may be propelled along the ground, that said wheels 17 will trail as the tricycle is propelled in a forward direction, and that, as the direction of the tricycle is changed by steering of the wheel 14, said caster wheels will automatically swivel to a trailing position in relation to the direction of movement of the tricycle.

The means 18 is here shown as a notch or recess 24 in the top wall 25 in either or both the caster frames 21, and a lever or dog 26 on a pivot 27 movable on said pivot between positions engaged in said slot and disengaged therefrom. In the engaged position, said dog locks the caster wheel in trailing position, as in FIG. 1; in the disengaged position, the caster wheel is free to swivel in the manner above indicated.

In this case, the pivot 27 is shown as provided on an ear 28 affixed, as by welding, to the frame portion 16.

Instead of the described slot and dog type of lock, the dog may be made in the form of a gravity bolt that slides between locking and releasing positions rather than swinging on a pivot. In this case, the wall 25 of the caster wall would have a hole rather than a slot. Another simple modification contemplates providing the lever 26 with a bifurcated end so that the same may straddle the caster frame and, thereby, lock it.

The means 19, in FIGS. 1–4, is shown as comprising an operating handle 29 on a pivot 30 on the frame 10 (or any other suitable place), and a link 31 extending between said handle and an arm 32 provided on the dog 26. In one position of handle 29, the dog locks the caster wheel; in the other, the dog is raised to release said wheel. As shown, an over-center arrangement may be provided so that both positions are maintained until the handle is manipulated.

Since the means 19 may be operated to move the dog 26 to locking position while the notch 24 is out of alignment with the dog, as in FIG. 4, for instance, an extensible connection 33 is provided in the link 31 to allow the handle to move to releasing position while the dog is intercepted by the caster frame 21. Of course, if the caster wheel is completely out of the way, then the dog 26 will move to a position at the side of the frame. In either case, when the caster wheel straightens to a trailing position during forward propulsion of the tricycle, the end of dog 26 will be cammed upwardly as, for instance, by the rounded corners 34 at the top of the frame, and said end will fall into the notch 24 to lock the wheel. Any suitable provisions, such as a spring 35, may be made to bias the dog to release position when the handle 29 is in release position.

In the modification of FIG. 5, the dog 26 is shown as a freely pivotal member that falls into locking position by gravity. In this case, the dog may be provided with an arm 36 that is operatively engaged by an operating rod or link 37 that may be moved by a handle similar to handle 29. Retraction of said rod allows the dog to fall to locking position, either directly into the notch 24 or after the same has been raised by the above-described camming action of the rounded corners 34. Projection of said rod 37 moves the dog to release position.

While the foregoing has illustrated and described what is now contemplated to be the best mode of carrying out the invention, the constructions are, of course, subject to modification without departing from the spirit and scope of the invention. Therefore, it is not desired to restrict the invention to the particular forms of construction illustrated and described, but to cover all modifications that may fall within the scope of the appended claim.

Having thus described the invention, what is claimed and desired to be secured by Letters Patent is:

A tricycle comprising a body frame mounting a forwardly disposed steering and drive wheel including pedal means operable to propel said tricycle, two rearwardly mounted caster wheels and an intermediately positioned seat for supporting a person driving said tricycle, said caster wheels being mounted on caster frames including a pintle supported on said body frame, said pintle being disposed perpendicularly to the ground, means for selectively locking and releasing the pivotal movement of at least one of said caster wheels, and control means supported on said body frame in a position readily actuated by a person in said seat for operating said locking and releasing means to control the movement of said one of said caster wheels.

References Cited by the Examiner
UNITED STATES PATENTS

| | | | |
|---|---|---|---|
| 210,435 | 12/78 | Root | 280—87.02 |
| 1,266,904 | 5/18 | Baker | 180—26 |
| 2,136,019 | 11/38 | Pfau | 280—87.01 |
| 2,197,658 | 4/40 | Gallo | 280—7.1 |
| 2,598,768 | 6/52 | Donald | 74—242.15 X |
| 2,656,050 | 10/53 | Best et al. | 16—35 X |
| 2,657,938 | 11/53 | Browne | 280—62 |
| 2,812,194 | 11/57 | Ajero | 280—269 |
| 2,817,539 | 12/57 | Stevens | 280—282 |
| 2,860,007 | 11/58 | Cornelius | 16—35 X |
| 3,062,559 | 11/62 | Hewitt | 280—202 |

MILTON BUCHLER, *Primary Examiner.*

PHILIP ARNOLD, A. HARRY LEVY, *Examiners.*